(12) United States Patent
Mi et al.

(10) Patent No.: US 10,746,633 B2
(45) Date of Patent: Aug. 18, 2020

(54) TISSUE SLICING DEVICE AND APPARATUS HAVING TISSUE SLICING DEVICE

(71) Applicant: SCL Biotech Ltd., Apia (WS)

(72) Inventors: Hsin-Wu Mi, New Taipei (TW);
Ming-Cheng Lee, New Taipei (TW)

(73) Assignee: SCL Biotech Ltd., Apia (WS)

( * ) Notice: Subject to any disclaimer, the term of this patent is extended or adjusted under 35 U.S.C. 154(b) by 741 days.

(21) Appl. No.: 15/475,279

(22) Filed: Mar. 31, 2017

(65) Prior Publication Data

US 2018/0231438 A1    Aug. 16, 2018

(30) Foreign Application Priority Data

Feb. 13, 2017    (TW) .............................. 106104581 A

(51) Int. Cl.
| | | |
|---|---|---|
| *G01N 1/06* | (2006.01) | |
| *G01N 1/28* | (2006.01) | |
| *G01N 1/04* | (2006.01) | |

(52) U.S. Cl.
CPC ............... *G01N 1/06* (2013.01); *G01N 1/286* (2013.01); *G01N 2001/045* (2013.01); *G01N 2001/2886* (2013.01)

(58) Field of Classification Search
CPC .. G01N 1/06; G01N 1/286; G01N 2001/2886; G01N 2001/045
See application file for complete search history.

(56) References Cited

U.S. PATENT DOCUMENTS

| | | | | |
|---|---|---|---|---|
| 5,614,376 | A * | 3/1997 | Copley | ..................... G01N 1/06 435/1.1 |
| 6,358,474 | B1 * | 3/2002 | Dobler | ..................... G01N 1/286 422/535 |
| 7,758,515 | B2 * | 7/2010 | Hibner | ............... A61B 10/0275 600/566 |
| 2002/0082519 | A1 * | 6/2002 | Miller | .................. A61B 10/025 600/566 |
| 2004/0049128 | A1 * | 3/2004 | Miller | .................. A61B 10/025 600/566 |
| 2006/0016747 | A1 * | 1/2006 | Sakaino | ............. B01D 39/2017 210/450 |
| 2017/0035398 | A1 * | 2/2017 | Park | ................... A61B 10/0275 |
| 2017/0360466 | A1 * | 12/2017 | Brown | ............ A61B 17/32002 |
| 2018/0368871 | A1 * | 12/2018 | Joseph | ............ A61B 17/32002 |

* cited by examiner

*Primary Examiner* — Nahida Sultana
(74) *Attorney, Agent, or Firm* — Alan D. Kamrath; Karin L. Williams; Mayer & Williams PC

(57) ABSTRACT

Provided is a tissue slicing device having a first motor, a filling assembly, a filter, a pipe, and a cutter. The filling assembly includes a tube and a piston rod movably inserted through the tube. One end of the piston rod abuts against the first motor. The filter is located at an end of the tube opposite the first motor. The pipe is located at a common side of the first motor and the filling assembly, and includes a nozzle located at an end of the pipe and proximal to an end of the filter opposite the filling assembly. The cutter is proximal to the filter. The guiding body is located at the end of the tube opposite the first motor. Provided is an apparatus having the tissue slicing device, such that manpower and time can be saved, and the tissue slicing degree can be unified.

16 Claims, 6 Drawing Sheets

TISSUE SLICING DEVICE AND APPARATUS HAVING TISSUE SLICING DEVICE

BACKGROUND OF THE INVENTION

1. Field of the Invention

The present invention relates to a slicing device, particularly to a tissue slicing device. The present invention also relates to an autonomic apparatus, particularly to an apparatus having the tissue slicing device.

2. Description of the Prior Arts

In the recent years, the technology of isolating the primary cell has been maturely developed, and the primary cell culture has been applied in various fields so the isolation of the primary cells is urgently needed for mass production and the manufacture standards need unification.

The isolation of the primary cell of the prior art has multiple steps, wherein a tissue slicing step is the most important step. The tissue slicing step not only must be accomplished within very few minutes, but also needs to avoid external contamination. Therefore, the current tissue slicing step can only rely on human operation, and the success and efficiency of the extract primary cell depend on the operator's proficiency and circumspection as well as the final size of the sliced tissue. When a large amount of primary tissue needs to be isolated and the isolation steps are processed by one operator only, the operation time of tissue slicing is increased. Once contamination occurs in the intermediate steps, it is often not found until the final stage of culturing and cannot be recovered.

Therefore, a slicing device for saving manpower and reducing contamination at the same time is needed, and the disadvantage of the prior art should be resolved.

SUMMARY OF THE INVENTION

According to the above description, the objective of the present invention is to provide a tissue slicing device and an apparatus having the tissue slicing device, such that manpower and time can be saved, and the size of sliced tissue can be unified.

To achieve the above objective of the present invention, the invention provides a tissue slicing device comprising a first motor, a filling assembly, a filter, a pipe, a cutter, and a guiding body. The filling assembly comprises a tube and a piston rod. The piston rod is movably inserted through the tube, and one end of the piston rod abuts against the first motor to connect the filling assembly to the first motor. The filter is located at an end of the tube of the filling assembly opposite the first motor. The pipe is located at a common side of the first motor and the filling assembly, and the pipe comprises a nozzle located at an end of the pipe and proximal to an end of the filter opposite the filling assembly. The cutter is proximal to the filter. The guiding body is located at the end of the tube of the filling assembly opposite the first motor, and encompasses the filter.

Preferably, the first motor is a stepper motor, a servo motor or an induction motor.

Preferably, the filter has multiple pores; the filter is proximal to an end of the filling assembly opposite the first motor, and the filter has conical protrusions among the pores.

Preferably, the cutter comprises a blade and a second motor connected to the blade, and the blade is moveable back and forth and is proximal to the end of the filter opposite the filling assembly.

Preferably, the cutter is an ultrasonic instrument for tissue biopsy slicers.

Preferably, the cutter is a laser system.

In another aspect, the present invention relates to an apparatus comprising the tissue slicing device as abovementioned and a shelf. The shelf comprises a base, two panels, and a rotating plate. The panels are L-shaped, each panel has one end, and the two ends of the two panels are each respectively connected to two opposite sides of the base. The rotating plate is rotatably located between the two panels, and is opposite the ends of the two panels connected to the base; one side of the rotating plate has a third motor, and the tissue slicing device is located at the rotating plate.

Preferably, the rotating plate has an elastic locking device, one end of the elastic locking device is mounted at a surface of the rotating plate, and another end of the elastic locking device movably abuts on the tube of the filling assembly of the tissue slicing device by elastic torsion.

More preferably, the pipe is located at a surface of the rotating plate opposite the filling assembly.

More preferably, the cutter is located at a surface of the rotating plate opposite the filling assembly.

The advantage of the tissue slicing device of the present invention is that the end of the piston rod abuts against the first motor, and the tissue in the tube is pushed by the piston rod so the tissue is squeezed and separated through each of the pores of the filter. The filter has conical protrusions among the pores for easily separating and squeezing the tissue through the pores, the tissue is subsequently cut by the cutter, and the buffer in the pipe is spread through the nozzle, thereby obtaining small spices of sliced tissues. Besides, the advantage of the apparatus having the tissue slicing device of the present invention is that the filling assembly can be unloaded from the tissue slicing device by the end of the elastic locking device movably abutting on the filling assembly. Because the rotating plate has the third motor for rotating and the tissue can be automatically sliced by the tissue slicing device, manpower and time can be saved, and the size of sliced tissue can be unified.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
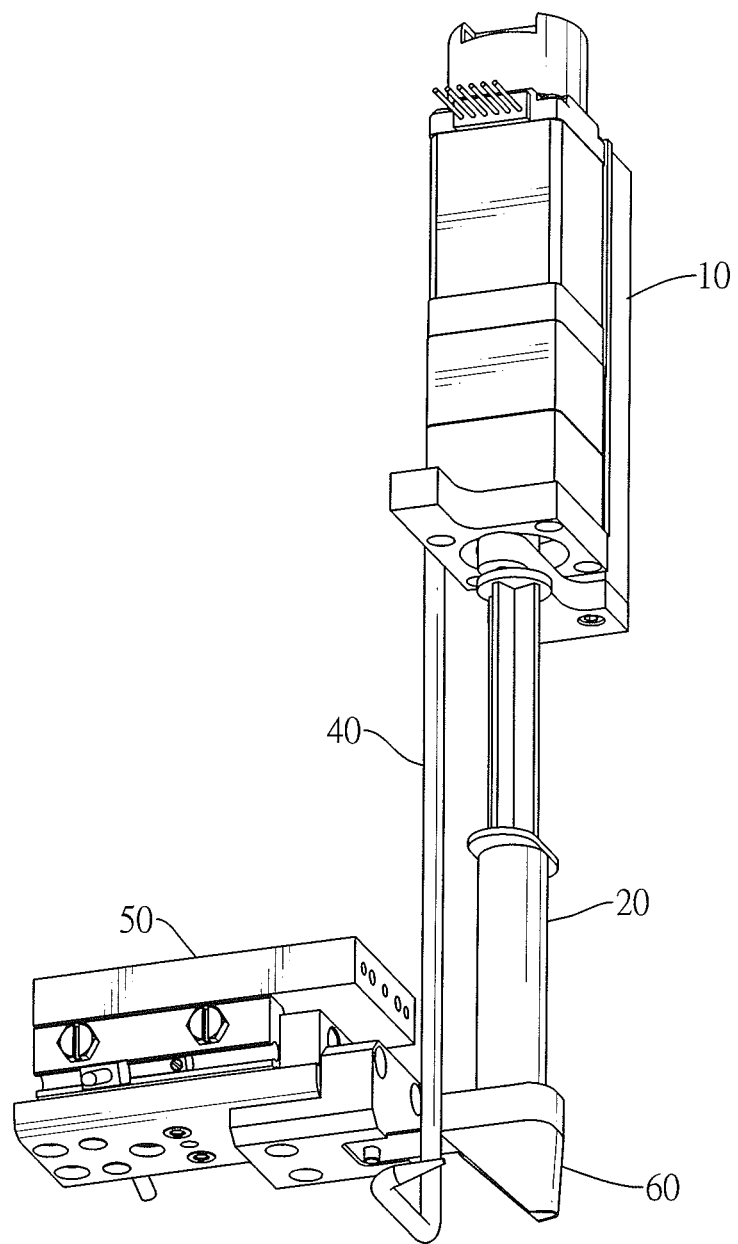
FIG. 1 is a perspective view of a tissue slicing device of the present invention.
Figure 2:
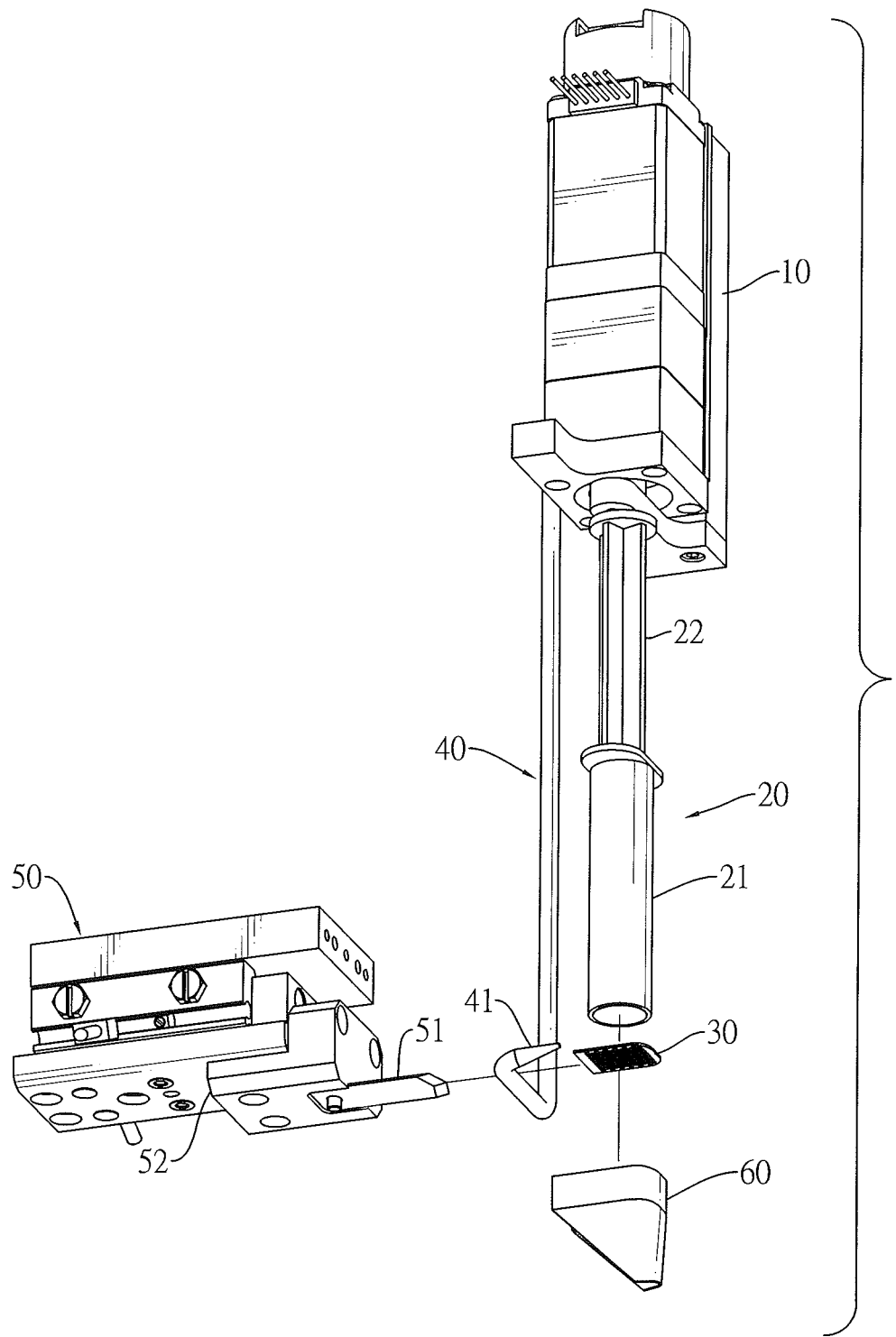
FIG. 2 is an exploded view of the tissue slicing device of the present invention.

As shown in FIG. 1 and FIG. 2, the tissue slicing device of the present invention provides a first motor 10, a filling assembly 20, a filter 30, a pipe 40, a cutter 50, and a guiding body 60.

The first motor 10 is a stepper motor, a servo motor or an induction motor.

The filling assembly 20 is connected to the first motor 10, and the filling assembly 20 comprises a tube 21 and a piston rod 22. The piston rod 22 is movably inserted through the tube 21, and one end of the piston rod 22 abuts against the first motor 10 to connect the filling assembly 20 to the first motor 10.

Figure 3:
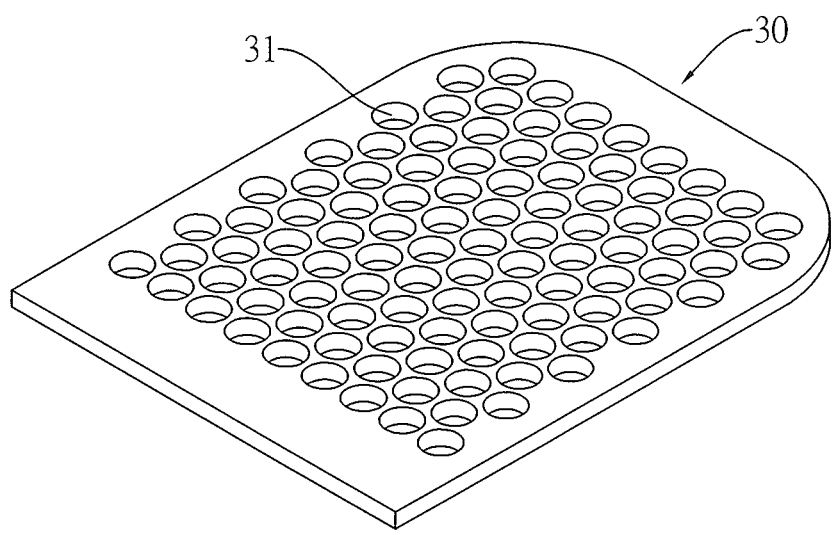
FIG. 3 is a perspective view of the filter of the tissue slicing device of the present invention.
Figure 4:
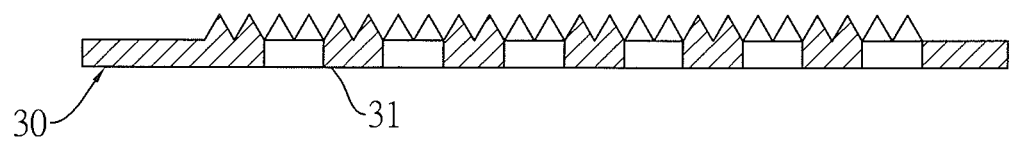
FIG. 4 is cross-sectional view of the preferred embodiment of the filter of the tissue slicing device of the present invention.

As shown in FIG. 2 to FIG. 4, the filter 30 is located at an end of the tube 21 of the filling assembly 20 opposite the first motor 10. The filter 30 has multiple pores 31; the filter 30 is proximal to an end of the filling assembly 20 that is opposite the first motor 10, and the filter 30 has conical protrusions among the pores 31.

The pipe 40 is located at a common side of the first motor 10 and the filling assembly 20 and comprises a nozzle 41. The nozzle 41 is located at an end of the pipe 40 and is proximal to an end of the filter 30 that is opposite the filling assembly 20. In a preferred embodiment, a container containing buffer is connected to the other end of the pipe 40 that is opposite the nozzle 41.

The cutter 50 is proximal to the filter 30 and comprises a blade 51 and a second motor 52 connected to the blade 51. The blade 51 is moveable back and forth and is proximal to the end of the filter 30 that is opposite the filling assembly 20. In a preferred embodiment, the cutter 50 is an ultrasonic instrument for tissue biopsy slicers. In another preferred embodiment, the cutter 50 is a laser system.

The guiding body 60 is located at the end of the tube 21 of the filling assembly 20 that is opposite the first motor 10, and encompasses the filter 30.

As shown in FIG. 2 to FIG. 4, when the tissue slicing device of the present invention is in use, a tissue is placed into the tube 21, and subsequently the piston rod 22 is inserted into the tube 21. As the end of the piston rod 22 abuts against the first motor 10, once the first motor 10 is turned on, the piston rod 22 is pushed and the tissue in the tube 21 is squeezed and separated through each of the pores 31 of the filter 30. Meanwhile, since the filter 30 is proximal to the end of the filling assembly 20 that is opposite the first motor 10 and the filter 30 has conical protrusions among the pores 31, the tissue is easily separated and squeezed through the pores 31. The tissue through the pores 31 is subsequently cut by the cutter 50, and buffer in the pipe 40 is spread through the nozzle 41, thereby obtaining sliced tissue. Besides, the sliced tissue can be guided and harvested by the guiding body 60.

Figure 5:
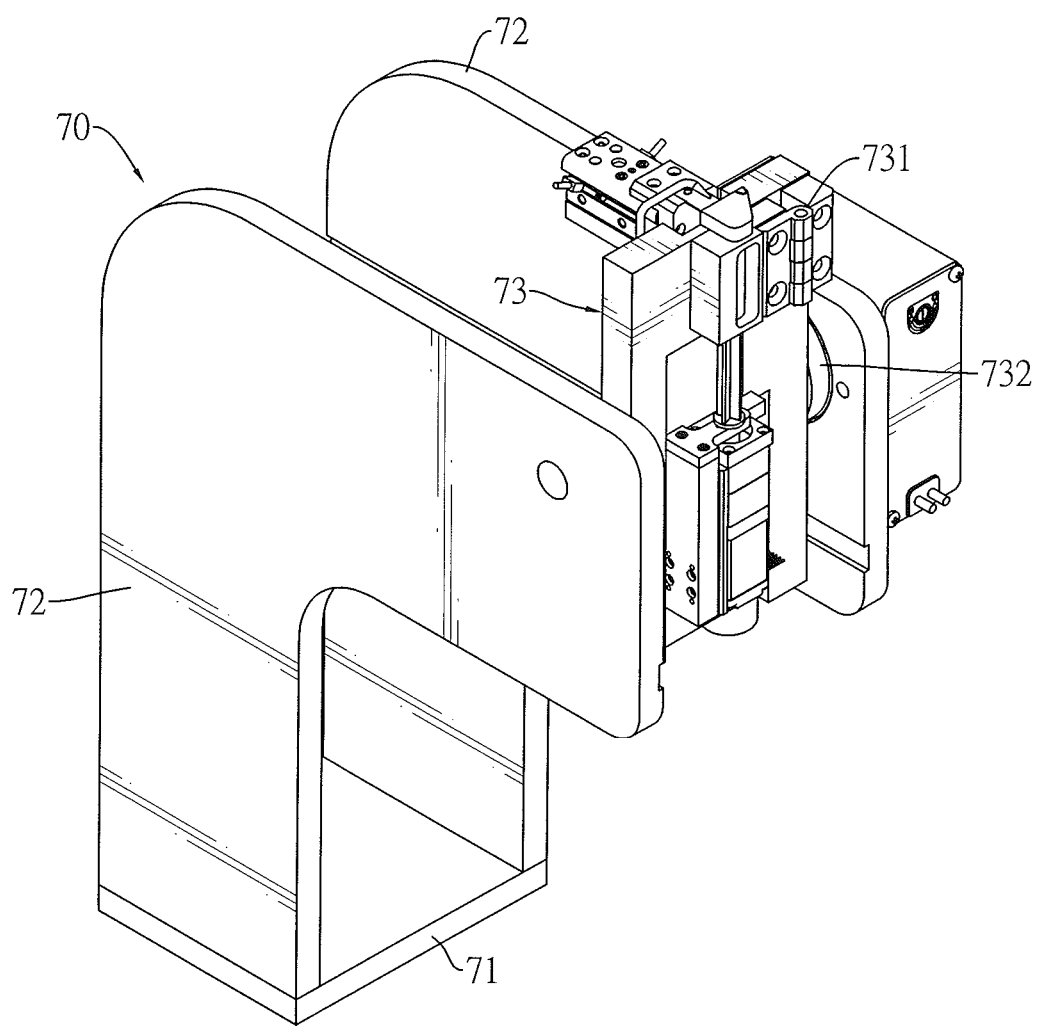
FIG. 5 is a perspective view of an apparatus having the tissue slicing device of the present invention.
Figure 6:
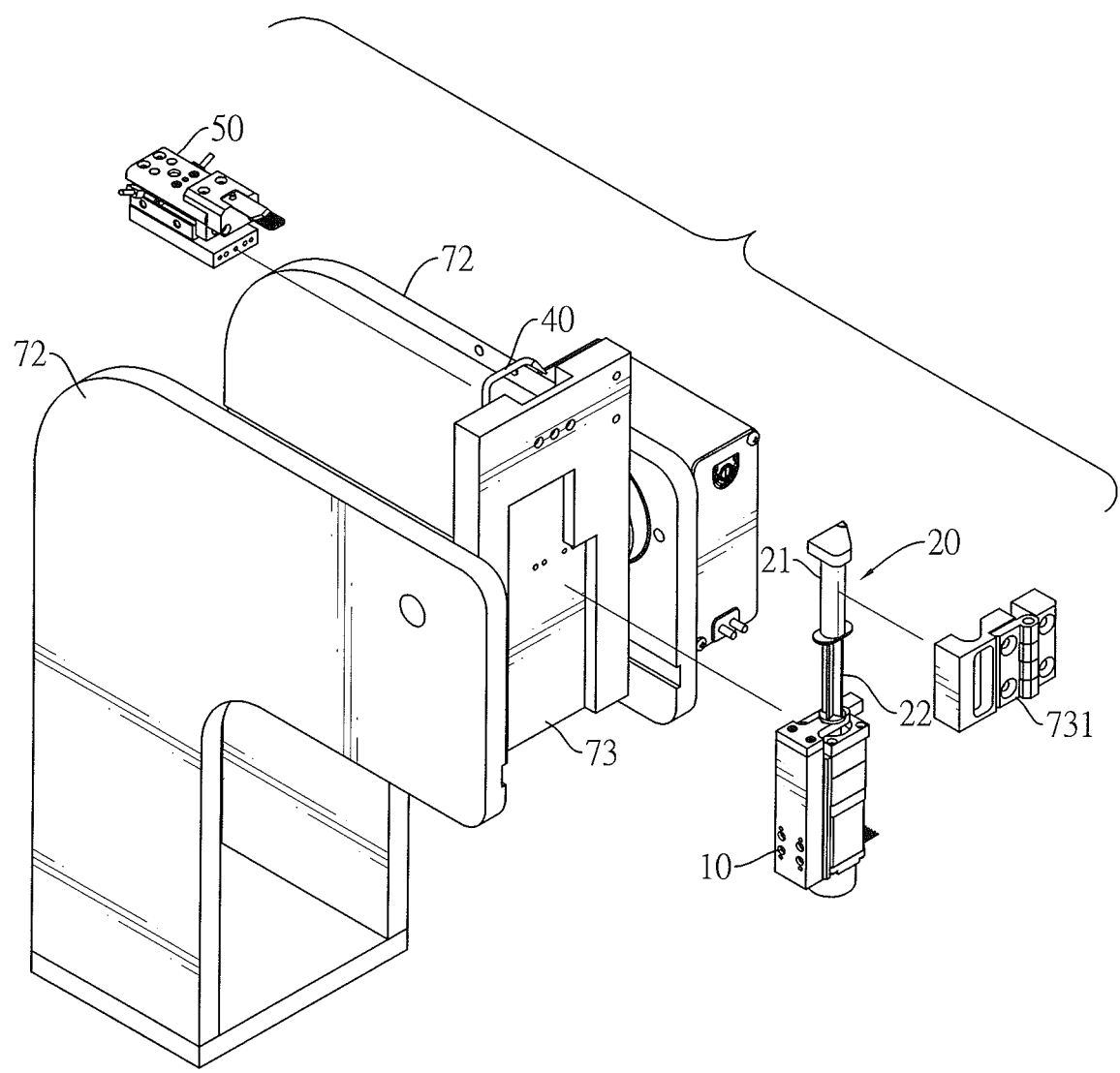
FIG. 6 is an exploded view of the apparatus having the tissue slicing device of the present invention.

As shown in FIG. 5 and FIG. 6, the present invention provides an apparatus comprising the tissue slicing device as abovementioned and a shelf 70.

The shelf 70 comprises a base 71, two panels 72, and a rotating plate 73. The panels 72 are L-shaped, and each panel 72 has one end connected to a respective side of the base 71. The rotating plate 73 is rotatably located between the two panels 72, and is opposite the ends of the two panels 72 that are connected to the base 71. The rotating plate 73 has an elastic locking device 731 and a third motor 732 located at one side of the rotating plate 73. One end of the elastic locking device 731 is mounted at a surface of the rotating plate 73, and another end of the elastic locking device 731 movably abuts on the tube 21 of the filling assembly 20 of the tissue slicing device by elastic torsion. The pipe 40 and the cutter 50 are located at a surface of the rotating plate 73 opposite the filling assembly 20.

When the apparatus having the tissue slicing device of the present invention is in use, the filling assembly 20 can be unloaded from the tissue slicing device by the end of the elastic locking device 731 that movably abuts on the filling assembly 20. When the filling assembly 20 is replaced to another filling assembly 20 having tissue, the end of the tube 21 opposite the first motor 10 is upward and the piston rod 22 is below the tube 21 to avoid the tissue outflow. When preparing to separate the tissue, the rotating plate 73 is rotated, and the end of the tube 21 opposite the first motor 10 is downward such that the sliced tissue will flow downward. The slicing process is the same as abovementioned, and when the slicing process is finished, the rotating plate 73 is rotated upward again. Because the rotating plate 73 has the third motor 732 for rotating and the tissue can be automatically sliced by the tissue slicing device, manpower and time can be saved, the efficacy of tissue slicing degree can be unified, and the size of the sliced tissue can be unified every time.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A tissue slicing device, comprising:
a first motor;
a filling assembly comprising:
    a tube; and
    a piston rod movably inserted through the tube, and one end of the piston rod abutting against the first motor to connect the filling assembly to the first motor;
a filter located at an end of the tube of the filling assembly opposite the first motor;
a pipe located at a common side of the first motor and the filling assembly, and the pipe comprising:
    a nozzle located at an end of the pipe and proximal to an end of the filter opposite the filling assembly;
a cutter proximal to the filter; and
a guiding body located at the end of the tube of the filling assembly opposite the first motor, and encompassing the filter.

2. The tissue slicing device as claimed in claim 1, wherein the first motor is a stepper motor, a servo motor or an induction motor.

3. The tissue slicing device as claimed in claim 1, wherein the filter has multiple pores, the filter is proximal to an end of the filling assembly opposite the first motor, and the filter has conical protrusions among the pores.

4. The tissue slicing device as claimed in claim 1, wherein the cutter comprises a blade and a second motor connected to the blade, and the blade is moveable back and forth and is proximal to the end of the filter opposite the filling assembly.

5. The tissue slicing device as claimed in claim 2, wherein the cutter has a blade and a second motor connected to the blade, and the blade is moveable back and forth and is proximal to the end of the filter opposite the filling assembly.

6. The tissue slicing device as claimed in claim 3, wherein the cutter has a blade and a first second motor connected to the blade, and the blade is moveable back and forth and is proximal to the end of the filter opposite the filling assembly component.

7. The tissue slicing device as claimed in claim 1, wherein the cutter is an ultrasonic instrument for tissue biopsy slicers.

8. The tissue slicing device as claimed in claim 2, wherein the cutter is an ultrasonic instrument for tissue biopsy slicers.

9. The tissue slicing device as claimed in claim 3, wherein the component is an ultrasonic instrument for tissue biopsy slicers.

10. The tissue slicing device as claimed in claim 1, wherein the cutter is a laser system.

11. The tissue slicing device as claimed in claim 2, wherein the cutter is a laser system.

12. The tissue slicing device as claimed in claim 3, wherein the cutter is a laser system.

13. An apparatus, comprising:
   a tissue slicing device comprising:
      a first motor;
      a filling assembly comprising:
         a tube; and
         a piston rod movably inserted through the tube, and one end of the piston rod abutting against the first motor to connect the filling assembly to the first motor;
      a filter located at an end of the tube of the filling assembly opposite the first motor;
      a pipe located at a common side of the first motor and the filling assembly, and the pipe comprising:
         a nozzle located at an end of the pipe and proximal to an end of the filter opposite the filling assembly;
      a cutter proximal to the filter; and
      a guiding body located at the end of the tube of the filling assembly opposite the first motor, and encompassing the filter; and
   a shelf comprising:
      a base;
      two panels being L-shaped and each of the two panels having one end and the two ends of the two panels each respectively connected to two opposite sides of the base; and
      a rotating plate rotatably located between the two panels and opposite the two ends of the two panels connected to the base; one side of the rotating plate having a third motor, and the tissue slicing device located at the rotating plate.

14. The tissue slicing device as claimed in claim 13, wherein the rotating plate has an elastic locking device, one end of the elastic locking device is mounted at a surface of the rotating plate, and another end of the elastic locking device movably abuts on the tube of the filling assembly of the tissue slicing device by elastic torsion.

15. The tissue slicing device as claimed in claim 14, wherein the pipe is located at a surface of the rotating plate opposite the filling assembly.

16. The tissue slicing device as claimed in claim 14, wherein the cutter is located at a surface of the rotating plate opposite the filling assembly.

* * * * *